2,983,692
Patented May 9, 1961

2,983,692

PREPARATION OF EXPANDABLE ETHYLENICALLY UNSATURATED POLYMER PARTICLES AND CELLULAR PRODUCT THEREFROM

Gaetano F. D'Alelio, Pittsburgh, Pa., assignor to Koppers Company, Inc., a corporation of Delaware No Drawing. Filed Nov. 24, 1953, Ser. No. 394,230

9 Claims. (Cl. 260—2.5)

This application is concerned with a new process for the preparation of cellular polymers. More particularly, it is concerned with the method for the preparation of cellular polymers utilizing as starting materials polymeric vinyl aryl compounds and their copolymers. In an important aspect of the invention, it is concerned with the production of cellular polymers from polymeric materials produced by suspension polymerization. A particular feature of the process of this invention is the introduction of a normally liquid expanding agent into an aqueous suspension of a polymeric vinyl aryl compound whereby there are produced free-flowing beads containing the expanding agent which upon heating produce cellular polymeric structures.

In the past, the production of cellular polymeric structures has been attained by a variety of methods such as the introduction of a normally gaseous expanding agent into the polymeric material under pressure followed by release of pressure whereby cellular material is produced; the physical admixture by such means as milling or masticating of a polymeric material and a normally liquid expanding agent followed by suitable shaping and heating to produce a cellular structure; and the admixture of chemical blowing agents which decompose with a polymeric material followed by decomposition of said blowing agents whereby cellular structures are produced.

With the advent of suspension polymerization which has found particular applicability in the polymerization of vinyl aryl compounds such as, for example, styrene, there has been made available polymeric materials in bead form which polymers are potentially useful for the production of cellular polymeric structures. However, according to known methods these bead polymers produced in aqueous suspensions must be separated from the suspension, washed, dried, and then admixed by one of the known methods with an expanding agent for the production of cellular polymeric structures.

It has been discovered as a feature of this invention that it is possible to introduce into a stabilized aqueous suspension of polymeric particles a normally liquid expanding agent and that this agent can be integrated with said particles without causing agglomeration or precipitation of the suspended polymer particles.

This invention comprises a process for the production of polymeric particles capable of being expanded to produce a cellular polymeric structure comprising forming an aqueous suspension of particles of a polymer derived from an ethylenically unsaturated hydrocarbon monomer, said suspension being stabilized by an inorganic suspending agent preferably in combination with an anionic surface-active agent, adding thereto a normally liquid expanding agent, maintaining said expanding agent in contact with said suspension until said agent is integrated with said polymer particles and separating said particles from said aqueous suspension. Thereafter, the polymer particles can be expanded individually to produce discrete cellular particles or can be placed in a mold and then heated to at least the incipient softening point of the polymeric material whereby the discrete polymer particles coalesce to produce an integral cellular polymeric structure. As used herein the term "polymer" is intended to embrace both homo- and co-polymers.

The invention is applicable to a variety of homopolymers and copolymers derived from hydrocarbon vinyl monomers. Such monomers are, for example, ethylene, styrene, nuclear dimethyl styrenes, isobutylene, vinyl naphthalene, etc.

Copolymers of hydrocarbon vinyl monomers such as, for example, styrene and butadiene, styrene and α-methyl styrene, styrene, butadiene and α-methyl styrene, styrene and isobutylene, styrene and dimethyl styrene, isobutylene and butadiene can be treated according to the process of this invention to produce free-flowing particles capable of being expanded to produce a cellular polymeric structure. Further, the invention is applicable to particles of blends of polymers such as, for example, "impact" polystyrene which is an admixture of polystyrene with an elastomer, such as, for example, a styrene-butadiene copolymer.

The invention has particular utility with respect to vinyl aryl polymers, such as, for example, polystyrene and its copolymers with such monomers as butadiene, α-methyl styrene and isobutylene.

In general, the requisites for a "normally liquid expanding agent" useful in this invention are that it be capable of being integrated with the particular polymeric material being treated without so altering the characteristics of the polymer particles that agglomeration or precipitation of the particles from the suspension occurs. Further, the expanding agent should have a high volatility, that is, that it boil somewhat below the incipient softening point of the particular polymeric material in connection with which it is to be used. Aliphatic hydrocarbons boiling below the incipient softening point of the polymer with which they are to be used are useful in the process of this invention.

It has been found that petroleum ethers and certain ligroines give excellent results when used as expanding agents in a process of this invention, particularly in connection with vinyl aryl polymers, especially polystyrene. Expanding agents boiling in the range 30–100° C. are useful. The preferred agents boil in the range 35–40° C., although excellent results are obtained with agents boiling in the range 35–65° C. denoted as the "pentane" fraction. Other examples of normally liquid expanding agents useful herein are the petroleum ethers boiling in the range 65–72° C. denoted as the "hexane" fraction and the petroleum ethers boiling in the range 95–100° C. denoted as the "heptane" fraction. Similarly useful are the pure hydrocarbons boiling in the range 35–100° C. such as, for example, pentane, hexane, heptane, cyclopentane, cyclopentadiene, etc., although it is preferred for reasons of economy to utilize mixtures of such hydrocarbons as petroleum ethers.

Further, it has been observed that minor quantities of volatile solvents for the particular polymeric material being processed can be admixed with the above-described petroleum ethers to give satisfactory normally liquid expanding agents. For example, there can be admixed with petroleum ether such compounds as chloroform, carbon tetrachloride, methyl ethyl ketone, toluene, etc. It is preferred that the minor quantities of such solvents not exceed 20% by weight of the normally liquid expanding agent. The criterion as to the upper limit of the amount of such volatile solvent to be admixed with the above-described aliphatic hydrocarbon expanding agents is that the resulting mixture is not a complete solvent for the particular polymer with which it is to be used.

As used herein the term "normally liquid expanding agents" embraces aliphatic hydrocarbons boiling in the range of approximately 35–100° C. and mixtures thereof with volatile solvents in such amounts that the resulting mixture is not a solvent for the polymer.

It has been observed that by the use of normally liquid expanding agents in amounts of from approximately 5 to 30 parts per 100 parts of free-flowing expandable beads, that is, polymer plus expanding agent, expanded polymeric structures are produced. Particularly good results are obtained in the range of above 7 parts as before described. The preferred amount of normally liquid expanding agent is 10 parts per 90 parts polymeric material.

The preferred class of dispersing agents utilizable herein are the difficultly-soluble phosphates described in Grim 2,594,913, that is, those phosphates which are difficultly soluble in water and contain for each phosphate group at least three equivalents of a metal, the carbonate of which is at most only slightly soluble in water. Of these phosphates particularly desirable results are obtained with the calcium and magnesium phosphates, particularly those having an apatite structure, for example, hydroxy apatite, $3Ca_3(PO_4)_2.Ca(OH)_2$.

Particularly useful are those phosphates which are comprised of particles predominantly in the range 0.2–0.005 micron. Other dispersing agents which find utility are, for example, zinc oxide, calcium carbonate, calcium fluoride, bentonite, talc, kaolin, kieselguhr, aluminum oxide, barium sulfate, magnesium carbonate, ferric carbonate, magnesium silicate, etc. It will be realized the dispersibility of these agents vary widely, a principal difference residing in the amount of polymeric material which can be present with relation to the water in the aqueous suspension without agglomeration or precipitation occurring. While lower polymer/water ratios must be utilized with the less effective suspending agents, the preferred phosphate suspending agents can be used with a polymer/water ratio as high as approximately 2.33/1. In connection with the treatment of polystyrene utilizing a tricalcium phosphate composed of approximately equal parts of tricalcium phosphate monohydrate and hydroxy apatite in combination with sodium dodecylbenzene sulfonate, excellent results have been obtained with a polymer/water ratio of approximately 1.35/1.

Although it is preferred to utilize the combination of a phosphate suspending agent and an anionic surface-active agent, it will be realized that the suspending agent can be utilized alone. However, since their ability to suspend the polymeric particles is augmented by combination with the anionic surface-active agents, the use of the suspending agent alone requires the use of lower polymer/water ratios.

As described above, the process of this invention comprises as one of its steps maintaining the normally liquid expanding agent in contact with the suspended polymer until the expanding agent is integrated with the polymeric material. It has been observed that the time required for this to occur varies widely and depends upon such factors as the temperature and pressure of the system, the polymer being treated, the particular normally liquid expanding agent utilized, and the relative amounts of polymer and expanding agent utilized. For example, utilizing 70 parts polystyrene and 30 parts petroleum ether boiling in the range 35–65° C. at atmospheric pressure and 20° C., there were obtained at the end of 60 hours polymer particles containing the petroleum ether which upon heating yielded cellular polystyrene.

In the treatment of polystyrene, it is preferred to utilize a polymer/expanding agent ratio of 90/10 and to maintain the system at approximately 90° C. for from approximately 2 to 4 hours. The pressure of this system ranges as high as approximately 65 pounds per square inch gauge. It is to be noted that increased pressure is desirable in this system since it tends to decrease the time required for the integration of the normally liquid expanding agent with the polymeric material.

It has been observed that treatment time of 2 hours at 70° C. for 80 parts polystyrene and 20 parts petroleum ether boiling in the range 35–65° C. yields free-flowing beads which are capable of being expanded to produce a cellular structure. Further, one-hour treatment at 70° C. of 70 parts polystyrene and 30 parts of the above-described petroleum ether yields satisfactory free-flowing expandable beads.

Although it is not necessary, it is preferred that the suspending agent be removed from the polymer particles. When utilizing the phosphate suspending agents, this can be accomplished easily by washing the polymer particles with dilute hydrochloric acid.

The aqueous dispersions to which are added the normally liquid expanding agents can be formed by adding the desired amount of suspending agent, for example, tricalcium phosphate, hydroxy apatite or magnesium phosphate with or without an anionic surface-active agent to the desired amount of water, stirring and adding thereto the polymer particles. The normally liquid expanding agent is then added, the system closed and the temperature raised to the desired point for the desired period of time. Although it is not necessary, it is preferred that the suspension be agitated such as, for example, by stirring since this not only reduces the time required to complete integration of the expanding agent with the polymeric material but assures uniformity of treatment.

Alternately, and in particular, in connection with a liquid monomer, such as, for example, styrene, the polymerization can be effected in suspension as described in Grim 2,594,913. Thereafter, without cooling the suspension of the polystyrene beads, there can be added under pressure the desired amount of the normally liquid expanding agent such as petroleum ether and the suspension stirred for preferably from 2 to 4 hours to produce free-flowing polymeric beads having integrated therein the normally liquid expanding agent.

It has been noted in connection with polystyrene that particularly excellent results are obtained in the production of cellular polymer structures when polystyrene beads of a size between 10–30 mesh are utilized. Smaller beads and even polymer particles such as are produced by emulsion polymerization can be utilized. Further, granules or pellets of a size normally utilized for molding purposes can be treated by the process of this invention to yield polymer particles capable of being expanded to produce a cellular structure. However, beads in the above-recited size range are preferred for general purpose use.

The cellular polymeric structures are obtained by expansion of the normally liquid expanding agent integrated with the polymeric material. This can be accomplished by various methods of heating such as, for example, with air or steam.

The products of varying density can be obtained by varying the quantity of expandable beads placed in a mold and expanded by the introduction of steam or introduction of water followed by heating of the mold to produce steam. For example, when approximately 7–8 percent of the mold volume is filled with expandable polystyrene beads, the mold having vent means therein closed and steam thereafter introduced, there is obtained a cellular polystyrene structure of a density of approximately 2.2 pounds per cubic foot which structure has small voids.

By the above expansion there can be obtained desirable polymeric structures having densities as low as approximately 1 pound per cubic foot, that is, 0.016 specific gravity. These products have low thermal conductivity and good compressive and impact strengths.

Discrete particles of cellular structure can be obtained, for example, by dropping the beads into hot water and allowing expansion to take place or by heating in air. Thus, by varying the time of heating products of different densities are obtained. For example, Table I illustrates the variance of the density of the product with time of immersion in water at 95° C. of expandable polystyrene beads containing 90 parts polystyrene and 10 parts "pentane" fraction petroleum ether.

TABLE I

| Time of exposure: | Density (#/cubic ft.) |
|---|---|
| 0 | 32.8 |
| 10 seconds | 22.1 |
| 30 seconds | 9.5 |
| 60 seconds | 4.2 |
| 120 seconds | 2.6 |
| 1 hour | 1.5 |

Table II illustrates treatment of similar beads in an oven at 120° C. for varying times.

TABLE II

| Time of exposure: | Density (#/cubic ft.) |
|---|---|
| 0 | 32.8 |
| 5 minutes | 32.8 |
| 10 minutes | 32.8 |
| 20 minutes | 2.94 |
| 30 minutes | 1.90 |
| 1 hour | 1.36 |
| 2 hours | 0.96 |

As used herein the terms "parts" and "percentages" are parts and percentages by weight unless otherwise specified.

The invention is illustrated by but not restricted to the following preferred embodiments.

*Example I*

To a kettle equipped with a stirrer 354 parts of deionized water are admixed with 3.72 parts of a tricalcium phosphate composed of approximately 50 parts tricalcium phosphate monohydrate and 50 parts hydroxy apatite and the system purged with nitrogen. There is then added with nitrogen purging 428 parts styrene containing 0.868 part benzoyl peroxide and 0.189 part tertiary-butyl perbenzoate. Stirring is commenced and there is added 0.0164 part Nacconol sodium dodecylbenzene sulfonate. The system is heated over a period of approximately 1¼ hours to approximately 90° C. and held there for approximately 6½ hours. Thereafter the temperature is raised over a period of approximately ¾ hour to 115° C. and held there for 3 hours after which the temperature is reduced to 90° C. There is added under pressure 47.6 parts petroleum ether boiling in the range 35–65° C. and the system maintained at 90° C. at approximately 60–70 p.s.i. for 4 hours. The suspension is cooled, the beads separated therefrom by centrifuging and the beads washed with dilute hydrochloric acid. There are obtained free-flowing expandable polystyrene beads containing petroleum ether. These expandable beads may be used in a wet condition or dried to remove the small amounts of surface water attached to them.

A mold having vent means therein is filled approximately 8 percent full of the beads, the mold closed and steam introduced therein. After 10 minutes the addition of steam is discontinued, the mold opened and the product removed. There is obtained cellular polystyrene having small voids and a density of approximately 2.2 pounds per cubic foot.

When approximately 1 part hydroxy apatite is used in place of the tricalcium phosphate in the foregoing example, substantially identical results are obtained. Similarly, there can be substituted for the tricalcium phosphate the various phosphates and for the Nacconol sodium dodecylbenzene sulfonate the various anionic surface-active agents described in Grim 2,594,913, particularly in amounts of from 0.002–0.004 part/100 parts suspension.

*Example II*

To a suitable vessel equipped with a stirrer there is added 768 parts water and 16.8 parts of the tricalcium phosphate of Example I. Stirring is commenced and there is added 192 parts polystyrene beads, approximately 85% of which are of a size in the range 10–30 mesh. There is added 0.048 part sodium dodecylbenzene sulfonate and 21.3 parts petroleum ether boiling in the range 35–65° C. are added. The system is closed and the temperature is raised over a period of approximately 1¼ hours to 90° C. and held there for approximately 4 hours. The suspension is then cooled. One-half the charge is centrifuged to give free-flowing polystyrene beads having integrated therein the petroleum ether which upon molding as described in Example I yield cellular polystyrene.

The remaining one-half of the charge is acidified to a pH of approximately 2.0 with hydrochloric acid and is centrifuged and the beads washed with cold water. There are obtained free-flowing polystyrene beads having integrated therein petroleum ether which, upon molding as described in Example I, yield cellular polystyrene.

The beads from the portion of the charge which is not acidified before centrifuging has some suspending agent admixed therewith. The cellular products derived from these beads have less mechanical strength than do the beads from which the suspending agent has been removed by the acid treatment.

When approximately 4 parts hydroxy apatite are used in place of the tricalcium phosphate in the foregoing example, substantially identical results are obtained. Similarly, there can be substituted for the tricalcium phosphate the various phosphates and for the Nacconol sodium dodecylbenzene sulfonate the various anionic surface-active agents described in Grim 2,594,913.

*Example III*

Various suspensions composed of 80 parts water and 20 parts polystyrene beads are prepared using 1.75 parts of the tricalcium phosphate described in Example I and 0.005 part Nacconol sodium dodecylbenzene sulfonate. The amounts and compositions of the normally liquid expanding agent are indicated in the below set out Table III. These suspensions are placed in a closed system and agitated while being maintained at approximately 90° C. for 4 hours. There are obtained in each instance free-flowing beads, which upon expansion produce cellular polystyrene. It is observed that when less than 5 parts expanding agent per 95 parts polymeric materials are utilized, the results obtained upon heating the beads are not uniform and that in some instances there is failure to produce an integral cellular structure. Additionally, as the amount of expanding agent is increased above approximately 15 parts per 85 parts polymeric particles, there is a tendency towards the production of cellular structures having medium or large sized voids.

TABLE III

| Polystyrene Parts | Normally Liquid Expanding Agent | | | |
|---|---|---|---|---|
| | Petroleum Ether | | Additive | |
| | Type | Parts | Type | Parts |
| 94 | "Pentane" | 4.3 | Chloroform | 1.7 |
| 94 | do | 4.7 | do | 1.3 |
| 94 | do | 5.1 | do | 0.9 |
| 94 | do | 5.4 | do | 0.6 |
| 94 | do | 5.6 | do | 0.4 |
| 92 | do | 5.7 | do | 2.3 |
| 92 | do | 6.3 | do | 1.7 |
| 92 | do | 6.9 | do | 1.1 |
| 92 | do | 7.1 | do | 0.9 |
| 92 | do | 7.4 | do | 0.6 |
| 90 | do | 7.1 | do | 2.9 |
| 90 | do | 7.9 | do | 2.1 |
| 90 | do | 8.6 | do | 1.4 |
| 90 | do | 8.9 | do | 1.1 |
| 90 | do | 9.3 | do | 0.7 |
| 88 | do | 8.6 | do | 3.4 |
| 88 | do | 9.4 | do | 2.6 |
| 88 | do | 10.3 | do | 1.7 |
| 88 | do | 10.7 | do | 1.3 |
| 88 | do | 11.1 | do | 0.9 |
| 86 | do | 10 | do | 4 |
| 86 | do | 11 | do | 3 |
| 86 | do | 12 | do | 2 |
| 86 | do | 12.5 | do | 1.5 |
| 86 | do | 13 | do | 1 |
| 84 | do | 11.4 | do | 4.6 |
| 84 | do | 12.6 | do | 3.4 |
| 84 | do | 13.7 | do | 2.3 |
| 84 | do | 14.3 | do | 1.7 |
| 90 | "Hexane" | 7.1 | do | 2.9 |
| 90 | do | 8.6 | do | 1.4 |
| 90 | do | 8.9 | do | 1.1 |
| 90 | do | 9.3 | do | 0.7 |
| 90 | "Pentane" | 8.6 | Methylethyl ketone | 1.4 |
| 90 | do | 8.6 | Carbon tetrachloride | 1.4 |
| 90 | do | 8.6 | Trichlorethylene | 1.4 |
| 90 | do | 8.6 | Toluene | 1.4 |

Note.—"Pentane" (B.P. 37–58° C.). "Hexane" (B.P. 60–67° C.). "Heptane" (B.P. 90–95° C.).

*Example IV*

The procedure of Example III is duplicated except that for the normally liquid expanding agents there used there are substituted the below indicated petroleum ethers as expanding agents. Cellular structures having small voids are obtained upon expansion in all instances except wherein less than 5 parts expanding agent is used, that is, with 98 parts polystyrene and 2 parts "pentane" fraction, 97 parts polystyrene and 3 parts "hexane" fraction and 97 parts polystyrene and 3 parts "heptane" fraction, when no expansion is observed. In the instance wherein 85 parts polystyrene and 15 parts "pentane" fraction is used, medium voids are noted.

TABLE IV

| Polystyrene | Petroleum Ether | |
|---|---|---|
| | Type | Parts |
| 90 | "Pentane" | 10 |
| 93 | do | 7 |
| 95 | do | 5 |
| 98 | do | 2 |
| 88 | do | 12 |
| 85 | do | 15 |
| 90 | "Hexane" | 10 |
| 97 | do | 3 |
| 94 | do | 6 |
| 97 | "Heptane" [1] | 3 |
| 94 | do [1] | 6 |
| 90 | do [1] | 10 |
| 93 | {"Pentane" / "Heptane"} | {7 / 1} |

[1] See Table III footnote

*Example V*

A suspension composed of 90 parts each of water and polystyrene beads is prepared using as a suspending agent 0.9 part hydroxy apatite, said apatite being comprised of particles predominantly of the size in the range 0.2–0.005 micron. There is added 10 parts "pentane" fraction and the suspension is stirred while it is heated to 90° C. where it is maintained while stirring for 2–4 hours. The suspension is cooled, the beads separated therefrom by centrifuging and the beads washed in dilute hydrochloric acid. There are obtained free-flowing expandable beads containing petroleum ether.

A mold having vent means therein is filled approximately 12–15% full of beads, the mold closed and steam introduced therein. After 2 to 10 minutes the addition of steam is discontinued, the mold opened and the product removed. There is obtained cellular polystyrene having small voids and a density of approximately 3 lbs. per cubic foot.

For the hydroxy apatite utilized in the foregoing procedure there can be substituted equal quantities of the various above described phosphates, such as, for example, trimagnesium phosphate having an apatite structure, the particle size of which phosphates is predominantly in the range above described.

*Example VI*

A suspension of 90 parts water and 10 parts polystyrene is prepared using as a suspending agent one part magnesium trisilicate. There is added 1.1 parts "pentane" fraction and the suspension stirred while it is heated to and maintained at 90° C. for approximately 2–4 hours. There are obtained free-flowing expandable polystyrene beads containing petroleum ether therein. Upon expansion as described in Example V substantially similar results are obtained. When 0.5 part talc is substituted in the foregoing procedure for the magnesium trisilicate there used, substantially similar results are obtained. Similarly, when there is substituted for the magnesium trisilicate utilized in the foregoing procedure approximately equal parts of zinc oxide, calcium carbonate, aluminum oxide, barium sulfate, and magnesium and ferric carbonates, substantially similar results are obtained. Further, equal parts of bentonite, kaolin, and kieselguhr can be substituted for the magnesium trisilicate to give satisfactory results.

*Example VII*

Polystyrene beads are prepared by heating and stirring at approximately 90° C. an aqueous suspension of 50 parts water, 50 parts styrene and 0.5 part hydroxy apatite of a particle size described in Example V, said styrene containing 0.5% benzoyl peroxide (based on the styrene). Heating and stirring is carried out for approximately 5–6 hours after which time there is introduced under pressure 5.5 parts "pentane" fraction of petroleum ether and the stirring continued for 2–4 hours. The suspension is cooled and the beads separated therefrom by centrifuging after which they are washed with dilute hydrochloric acid. There are obtained free-flowing expandable polystyrene beads containing petroleum ether therein. Upon molding as described in Example I there is obtained an integral cellular polystyrene structure.

*Example VIII*

Particles of a co-polymer of 95 parts styrene and 5 parts butadiene are suspended in an aqueous suspension and treated with petroleum ether as described in Example I. There are obtained free-flowing expandable polymeric particles which upon expansion as described in Example I produce a cellular polymeric structure. Particles of a copolymer of 95 parts styrene and 5 parts alpha-methylstyrene can be substituted in the foregoing procedure for the styrene-butadiene copolymer there used. There are obtained free-flowing expandable polymer beads which upon expansion produce a cellular polymeric structure.

*Example IX*

Polyethylene particles are treated in an aqueous suspension with petroleum ether as described in Example I. There are obtained free-flowing expandable polyethylene particles containing petroleum ether therein. Upon expansion with steam superheated to approximately 120° C., according to the procedure outlined in Example I, there is obtained polyethylene having a cellular structure.

Example X

There are homogeneously admixed 95 parts polystyrene and 5 parts of a 76.5/23.5 butadiene/styrene copolymer and the mixture comminuted. The below-indicated amounts of these particles are suspended in an aqueous suspension as described in Example II and there are added the indicated amounts of petroleum ether boiling in the range 30–65° C. The systems are closed and heated to approximately 90° C. for 4 hours and the expandable polymer particles having integrated therein petroleum ether are separated from the suspension by centrifuging.

| Run No. | Polymer Particles Parts | Petroleum Ether Parts |
|---|---|---|
| 1 | 90 | 10 |
| 2 | 80 | 20 |
| 3 | 70 | 30 |

In each instance there are obtained expandable polymer particles. Upon molding (as described in Example I) of beads from run No. 2 there is obtained a cellular polymeric structure having good impact strength.

The various phosphate suspending agents described in Example II can be substituted in the foregoing procedure for the tricalcium phosphate there used.

Example XI

One hundred parts of a 75/25 butadiene/styrene copolymer is homogeneously admixed with 0.5 part sulfur, 1.5 part sodium diethyl dithiocarbamate and 3 parts tetraethylthiuram disulfide. The composition is formed into granules of a size normally utilized for molding purposes and suspended in an aqueous suspension and treated with petroleum ether as described in Example II.

The expandable polymer beads are expanded in a mold as described in Example I and the cellular polymer structure subjected to an open steam cure at approximately 390° F. for 7–10 seconds. There is obtained a cured cellular polymeric structure having good impact strength. Various styrene/butadiene copolymers of styrene contents ranging as low as those usually found in GR-S rubbers can be substituted in the foregoing procedure for the copolymer there used to obtain cured cellular polymeric structures.

It will be realized that in the foregoing examples for the Nacconol sodium dodecylbenzene sulfonate there can be substituted the various anionic surface-active agents disclosed in Grim 2,594,913 and that the amounts of these various agents described as useful in that patent are useful herein.

While the invention has been described with reference to particular embodiments thereof, it will be understood that in its broader aspects the invention is not limited thereto, but the invention may be variously embodied within the scope of the invention as set forth herein and in the appended claims.

What is claimed is:

1. A process for the production of polymeric particles capable of being expanded to produce a cellular polymeric structure comprising forming an aqueous suspension of particles of a polymer obtained by polymerizing an ethylenically unsaturated hydrocarbon monomer, said suspension being stabilized by an inorganic difficultly water-soluble dispersing agent and an anionic surface-active agent, adding thereto a normally liquid aliphatic hydrocarbon boiling in the range 35°–100° C., maintaining said hydrocarbon in contact with said suspension until said hydrocarbon is integrated with said polymer particles and separating said particles from said aqueous suspension.

2. A process of claim 1 in which the inorganic difficultly water-soluble dispersing agent is hydroxy apatite and the anionic surface-active agent is sodium dodecylbenzene sulfonate.

3. A process of claim 1 in which the polymer is a mono-vinyl aryl polymer.

4. A process of claim 1 in which the polymer is polystyrene.

5. A process of claim 4 in which the difficultly water-soluble dispersing agent is hydroxy apatite, the anionic surface-active agent is sodium dodecylbenzene sulfonate, and the aliphatic hydrocarbon is petroleum ether of a boiling range of from 30–65° C.

6. A process of claim 4 in which said inorganic difficultly water-soluble dispersing agent is magnesium phosphate, the anionic surface-active agent is sodium dodecylbenzene sulfonate, and the aliphatic hydrocarbon is petroleum ether of a boiling range of from 30–65° C.

7. A process for the production of shaped cellular polymeric structures comprising forming an aqueous suspension of particles of a polymer obtained by polymerizing an ethylenically unsaturated hydrocarbon monomer, said suspension being stabilized by an inorganic difficultly water-soluble dispersing agent, adding thereto a normally liquid aliphatic hydrocarbon having a boiling point below the incipient softening point of said polymer, maintaining said aliphatic hydrocarbon in contact with said suspension until said hydrocarbon is integrated with said polymer particles, separating said particles from said aqueous suspension, filling a mold with said polymer particles, heating said polymer particles to at least the incipient softening point of the polymer whereby the discrete polymer particles coalesce to produce an integral cellular polymeric structure and removing said structure from said mold.

8. A process for the production of polystyrene beads capable of being expanded to produce cellular polystyrene comprising forming an aqeous suspension of 100 parts polystyrene beads and approximately 83 parts water, said suspension being stabilized by 0.87 part tricalcium phosphate comprised of approximately equal parts of tricalcium phosphate monohydrate and hydroxy apatite and 0.002–0.004 part sodium dodecylbenzene sulfonate, adding thereto 10 parts of petroleum ether of a boiling range of 35–65° C., maintaining said petroleum ether in contact with said suspension at approximately 90° C. for approximately 1–4 hours, cooling said suspension, and separating said beads therefrom.

9. The process of claim 8 in which the beads are washed with dilute hydrochloric acid after separating from said suspension.

References Cited in the file of this patent

UNITED STATES PATENTS

| | | |
|---|---|---|
| 2,371,868 | Berg et al. | Mar. 20, 1945 |
| 2,373,347 | Schoenfeld | Apr. 10, 1945 |
| 2,435,999 | Dreyfus et al. | Feb. 17, 1948 |
| 2,442,940 | Staudinger et al. | June 8, 1948 |
| 2,493,965 | Haefele | Jan. 10, 1950 |
| 2,550,503 | Turnbull | Apr. 24, 1951 |
| 2,556,260 | Downing | June 12, 1951 |
| 2,681,321 | Stastny et al. | June 15, 1954 |
| 2,744,291 | Stastny et al. | May 8, 1956 |